United States Patent
Zushi et al.

(10) Patent No.: US 10,648,902 B2
(45) Date of Patent: May 12, 2020

(54) ANALYZER AND WARM-UP DETERMINATION METHOD

(71) Applicant: SHIMADZU CORPORATION, Kyoto-Shi, Kyoto (JP)

(72) Inventors: Jumpei Zushi, Kyoto (JP); Hiroyuki Yoshimura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/168,892

(22) Filed: Oct. 24, 2018

(65) Prior Publication Data

US 2019/0195780 A1    Jun. 27, 2019

(30) Foreign Application Priority Data

Dec. 26, 2017    (JP) .................................. 2017-248969

(51) Int. Cl.
  *G01N 21/03*    (2006.01)
  *G01J 3/10*    (2006.01)
  (Continued)

(52) U.S. Cl.
  CPC .......... *G01N 21/0332* (2013.01); *G01J 3/027* (2013.01); *G01J 3/0286* (2013.01);
  (Continued)

(58) Field of Classification Search
  CPC .... G01J 2003/106; G01J 3/027; G01J 3/0286; G01J 3/10; G01N 2021/0162; G01N 21/0332; G01N 2201/126
  See application file for complete search history.

(56) References Cited

U.S. PATENT DOCUMENTS

| | | | |
|---|---|---|---|
| 2009/0135419 A1* | 5/2009 | Finarov | G01J 3/02 356/319 |
| 2011/0208380 A1* | 8/2011 | Gale | F16H 59/72 701/22 |

(Continued)

FOREIGN PATENT DOCUMENTS

| | | |
|---|---|---|
| EP | 1 203 941 | 5/2002 |
| JP | H02242136 | 9/1990 |

(Continued)

OTHER PUBLICATIONS

EP 18207019.3, Extended European Search Report, dated Jun. 3, 2019, 8 pages—English.

(Continued)

*Primary Examiner* — Hina F Ayub
(74) *Attorney, Agent, or Firm* — Andrew F. Young, Esq.; Lackenbach Siegel, LLP

(57) ABSTRACT

A spectrophotometer 1 comprises a control unit 45 with a warming-up determination unit 452 that determines the completion of a warming-up based on a variation amount of a detection signal in a predetermined duration when a light detector 7 detects a light from a sample chamber without loading the sample. Specifically, the warming-up determination unit 452 calculates a difference between a signal intensity of the detection signal detected by the light detector 7 at the time when the predetermined time passes and a signal intensity of the detection signal detected by the light detector 7 at a previous time and determines that a warming-up is complete when a value of the difference is less than a first threshold value. The warming-up determination unit 452 automatically determines the completion of warming-up independently from the determination by the user.

7 Claims, 6 Drawing Sheets

(51) Int. Cl.
*G01J 3/02* (2006.01)
*G01N 21/01* (2006.01)
(52) U.S. Cl.
CPC ........... *G01J 3/10* (2013.01); *G01J 2003/106* (2013.01); *G01N 2021/0162* (2013.01); *G01N 2201/126* (2013.01)

(56) References Cited

U.S. PATENT DOCUMENTS

2015/0219493 A1    8/2015  Bungo
2016/0061717 A1*   3/2016  Bawolek .............. G01N 21/255
                                                          356/402

FOREIGN PATENT DOCUMENTS

JP    2001-221687    8/2001
JP    2012-032307    2/2012

OTHER PUBLICATIONS

EP 18207019.3, Response to EESR Communication dated Jan. 2, 2020, 17 pages—English.

* cited by examiner

ANALYZER AND WARM-UP DETERMINATION METHOD

CROSS REFERENCE TO RELATED APPLICATIONS

This application relates to, JP 2017-248969 filed Dec. 26, 2017, the entire contents of which are incorporated herein by reference.

FIGURE SELECTED FOR PUBLICATION

FIG. 1

BACKGROUND OF THE INVENTION

Field of the Invention

The present invention relates to an analytical instrumentation comprising a light source that radiates light to a sample and a light detector that detects transmitting light through the sample or a reflective light from the sample, to which the light source radiates the light, and further relates to a determination method of warming-up such an analytical instrumentation.

Description of the Related Art

Conventionally, an analytical device is widely used to carry out an analysis in which the light is radiated to the sample and the light from the sample is measured. Such an analytical instrumentation comprises the light source and the light detector that detects transmitting light through the sample or a reflective light from the sample, to which the light source radiates the light, and the analysis is carried out based on the detection signal from the light detector (refer to e.g., Patent Document 1).

For example, a deuterium lamp (D2 lamp) or a tungsten lamp (WI lamp) is applied to such an analytical instrumentation as the light source thereof. Such lamps require time following turning on the power source of the instrumentation until such as fluctuation dissipates, and the lamps become stable. Accordingly, warming-up for the analytical instrumentation is carried out for a constant time following turning on the power source of the instrumentation (i.e., in the standby mode for the constant time), and then after, the analysis operation starts.

RELATED PRIOR ART DOCUMENTS

Patent Document

Patent Document 1: JP Patent Published 2012-32307 A1

ASPECTS AND SUMMARY OF THE INVENTION

Objects to be Solved

According to the conventional analytical instrumentation, the warming-up time (standby time) is not adequately operative, so that the drawbacks, in the preparation time before starting the analysis operation takes longer, the light source is wasted longer than necessity, and the measurement precision worsens, takes place.

Specifically, according to the conventional analytical instrumentation, when carrying out the warming-up, the user should determine the length of the warming-up time. Therefore, even when the warming-up is actually over, the user determines incompletion of the warming-up and continues to warm up since then, so that the drawback in which the light source is further waster takes place. In addition, even when the warming-up is not actually over, the user determines completion of the warming-up and starts the analysis operation despite an instable light source, and as a result, the drawback, in which the precision of the measurement result worsens, takes place The present invention is completed under consideration of the above circumstance, and the purpose of the present invention is to provide an analytical instrumentation that is feasible to be warmed up in a suitable period of time and a determination method of warming-up time with respect to such an analytical instrumentation.

Means for Solving the Problem (1) According to the aspect of the present invention, an analytical instrumentation comprises a light source, a light detector and a warming-up determination unit. The light source unit radiates a light to a sample. The light detector detects the transmitting light through the sample or the reflective light from the sample, to which the light source radiates the light. The warming-up determination unit determines the completion of the warming-up based on the variation amount of the detection signal in a predetermined duration when the light detector detects the light from light source without transmitting the sample or reflecting from the sample.

According to such an aspect, the warming-up determination unit determines completion of the warming-up based on the variation amount of the detection signal by the light detector.

Accordingly, the warming-up determination unit automatically determines the completion of warming-up independently from the determination by the user. And when the analysis operation starts relative to the analytical instrumentation based on the warming-up result determined by the warming-up determination unit, the analysis is carried out using the analytical instrumentation that is warmed up just in a suitable time duration.

In such a way, the analytical instrumentation according to the aspect of the present invention is warmed up for the suitable time.

(2) The warming-up determination unit may determine the completion of warming-up based on the variation amount of the voltage or the current input into the light source in the predetermined duration.

According to such an aspect, the warming-up determination unit determines completion of the warming-up based on the variation amount of the detection signal by the light detector.

Accordingly, the warming-up determination unit improves the determination accuracy relative to the completion of warming-up.

(3) In addition, the analytical instrumentation may further comprise a spectroscope and a temperature detector. The spectroscope disperses the light from the light source. The temperature detector detects the temperature of the spectroscope. The warming-up determination unit may determine the completion of warming-up based on the variation amount of the temperature detected by the temperature detector within the predetermined duration.

According to such an aspect, the warming-up determination unit determines the completion of the warming-up based on the variation amount of the temperature of the spectroscope detected by the temperature detector in addition to the variation amount of the detection signal by the light detector.

Accordingly, the warming-up determination unit improves the determination accuracy relative to the completion of warming-up.

(4) In addition, the warming-up determination unit may repeat multiple times the determination process within the predetermined duration.

Accordingly, the warming-up determination unit further improves the determination accuracy relative to the completion of warming-up.

(5) In addition, the analytical instrumentation may further comprise a duration determination unit (circuit). The duration determination unit (circuit) may determine the predetermined duration with respect to the next determination of the warming-up determination unit based on the variation amount of the detection signal when the warming-up determination unit performs the determination during the predetermined duration.

According to such an aspect, the duration determination unit determines adequately the predetermined duration with respect to the next determination of the warming-up determination unit based on the variation amount of detection signal. For example, whereas when the variation amount of the detection signal is large, the duration determination unit determines so as to elongate the predetermined duration of the next determination of the warming-up determination unit; when the variation amount of the detection signal is small, the duration determination unit determines so as to shorten the predetermined duration of the next determination of the warming-up determination unit; so that the time of the predetermined duration can be suitably maintained.

(6) In addition, the analytical instrumentation may further comprise a memory storage and a duration determination unit (circuit). The memory storage stores the reference time that is a benchmark for completion of the warming-up. The duration determination unit determines the predetermined duration so that the closer to the reference time the predetermined duration is, the shorter the duration is.

According to such an aspect, the duration determination unit adequately determines the predetermined duration with respect to the next determination by the warming-up determination unit.

(7) In addition, the light source may comprise a first light source made of a deuterium lamp and a second light source made of a tungsten lamp. The analytical instrumentation may further comprise a light source switching unit that selectively switches the light from between the first light source and the second light source, so that the selected light is incident to the light detector. With respect to the predetermined duration, the light detector may detect the light from the first light source.

In general, the time from the time when the power source is turned on until the time when the deuterium lamp becomes stable is longer than the time from the time when the power source is turned on until the time when the tungsten lamp becomes stable.

According to the aspect set forth above, the warming-up determination unit determines completion of the warming-up based on the variation amount of the detection signal detected by the light detector that detects the light from the first light source made of the deuterium lamp. Specifically, the warming-up determination unit determines the completion of the warming-up based on the variation amount of the detection signal detected by the light detector that detects the light from the first light source made that takes a relatively long time until stabilized.

Accordingly, the warming-up determination unit improves the determination accuracy relative to the completion of warming-up.

In addition, the first light source (deuterium lamp) emits a ultraviolet (UV) light, so that the long radiation of the light from the first light source likely accelerates the deterioration of the optical unit. Therefore, the switching mirror is regularly in the second light source and the light source is switched to the first light source (deuterium lamp) to measure the sample only when carrying out the warming-up determination that takes place based on the predetermined duration, and then, is switched back to the second light source side following the measurement.

(8) According to the aspect of the present invention, the method of determining warming-up is the warming-up determination method of an analytical instrumentation that comprises a sample chamber that loads a sample, a light source that radiates a light to a position of the sample in the sample chamber, and a light detector that detects the light from the sample chamber. The warming-up determination method determines completion of the warming-up based on a variation amount of detection signal in a predetermined duration when the light detector detects said light from the sample chamber without loading any sample in the sample chamber.

Effects of the Present Invention

According to such an aspect, the warming-up determination unit determines the completion of the warming-up based on the variation amount of the detection signal detected by the light detector. Accordingly, the warming-up determination unit automatically determines the completion of warming-up independently from the determination by the user. As a result, the analytical instrumentation is warmed up for the suitable time.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
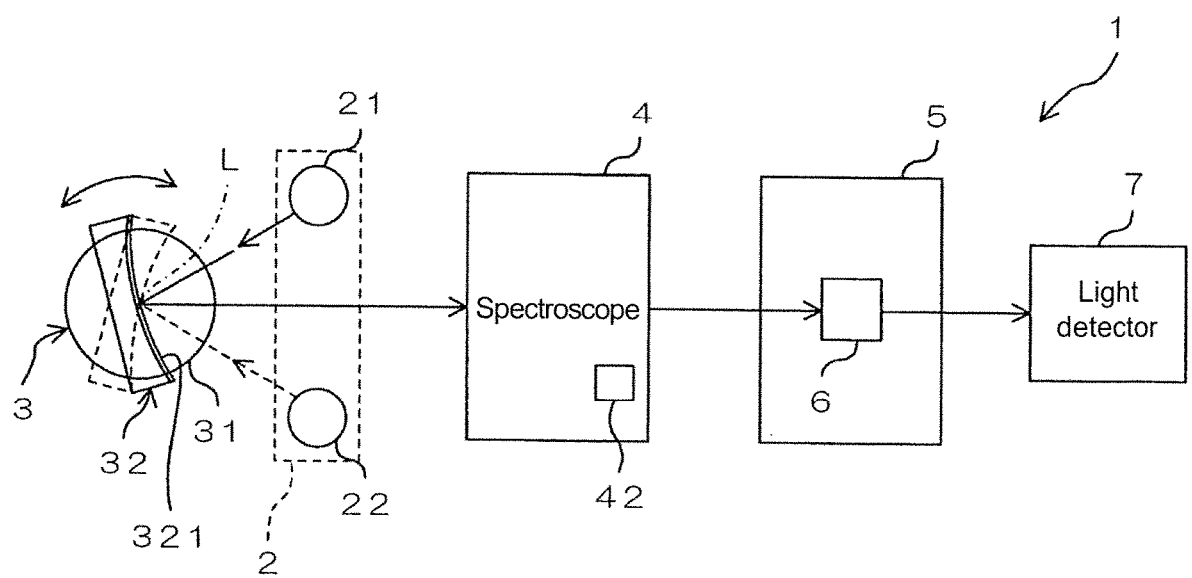
FIG. 1 is a schematic diagram illustrating an example of the structure of a spectrophotometer according to the aspect of the Embodiment 1 of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

1. Entire Structure of the Spectrophotometer

FIG. 1 is a schematic diagram illustrating an example of the structure of a spectrophotometer 1 according to the aspect of the Embodiment 1 of the present invention. The spectrophotometer 1 is a spectrophotometer that uses the light belonging to the UV region, the visible light region and the near infrared light region (mensurative light). The spectrophotometer 1 comprises a light source 2, a light source switching unit 3, a spectroscope 4, a sample chamber 5 and a light detector 7.

The light source 2 radiates the mensurative light and comprise the first light source 21 and the second light source 22.

The first light source 21 comprises a deuterium lamp (D2 lamp). The second light source 22 comprises a tungsten lamp (WI lamp). The first light source 21 and the second light source 22 are in-place apart from each other with some distance.

The light source switching unit 3 is in-place apart from the light source 2 with some distance. The light source switching unit 3 selectively switches the light from between the first light source 21 and the second light source 22, so that the selected light is incident to the light detector 7. The light source switching unit 3 comprises the rotation unit 31 and the switching mirror 32.

The rotation unit 31 is a circular disc. The rotation unit 31 is rotatable around the axis-line L as the rotation center. The rotation unit 31 rotates with a predetermined rotation angle by being provided with a driving force.

The switching mirror 32 is installed on the rotation unit 31. The switching mirror 32 is a concave mirror of which reflecting surface 321 is formed as a concave. The reflecting surface 321 of the switching mirror 32 faces the light source 2.

The spectroscope 4 is in-place in the opposite side of the light source switching unit 3 relative to the light source 2. The spectroscope 4 disperses the light from the light source 2. Despite not showing in FIG., the spectroscope 4 comprises a filter that cuts unwanted high-dimensional lights and the grating to take out the light having a specific wavelength, and further a split, through which the light passes, is installed thereto.

The sample chamber 5 is in-place apart from the spectroscope 4 with some distance. A sample cell 6 is in-place inside the sample chamber 5. The sample cell 6 holds a sample (not shown in FIG.). Despite not showing in FIG., the sample chamber 5 comprises a split through which the light passes.

The light detector 7 is in-place to be away from the sample chamber 5 with some distance. The light detector 7 detects the incident light and outputs the signal corresponding to the light intensity.

When carrying out the measurement using the spectrophotometer 1, first, the light switching unit 3 turns operative. Specifically, an angle of the reflecting surface 321 of the switching mirror 32 is adjusted by rotating the rotation unit 31. And the light radiated from either the first light source 21 or the second light source 22 is selectively reflected so as to be incident to the spectroscope 4.

And the grating inside the spectroscope 4 disperses the incident light to the spectroscope 4 to lights having each specific wavelength. And then, only the dispersed light having the specific wavelength is radiated from the spectroscope 4. The light radiated outside the spectroscope 4 is incident to the sample chamber 5 and radiates the sample cell 6 (sample).

And the light detector 7 detects the light (transmitted light) passing the sample cell 6 (sample) or the light (reflecting light) reflected from the sample cell 6 (sample).

The light detector 7 outputs the detection signal in accordance with the detected light. The spectrophotometer 1 generates a spectrum based on the detection signal from the light detector 7. And the sample analysis is performed based on the generated spectrum.

With respect to the spectrophotometer 1, when the above analysis operation is carried out, warming-up is carried out in advance to obtain the constant and reliable measurement results. The spectrophotometer 1 comprises the following components to carry out the warming-up in an adequate timing, and in addition, the following control operation is carried out.

2. Control Unit and an Electrical Configuration of the Peripheral Members Thereof.

Figure 2:
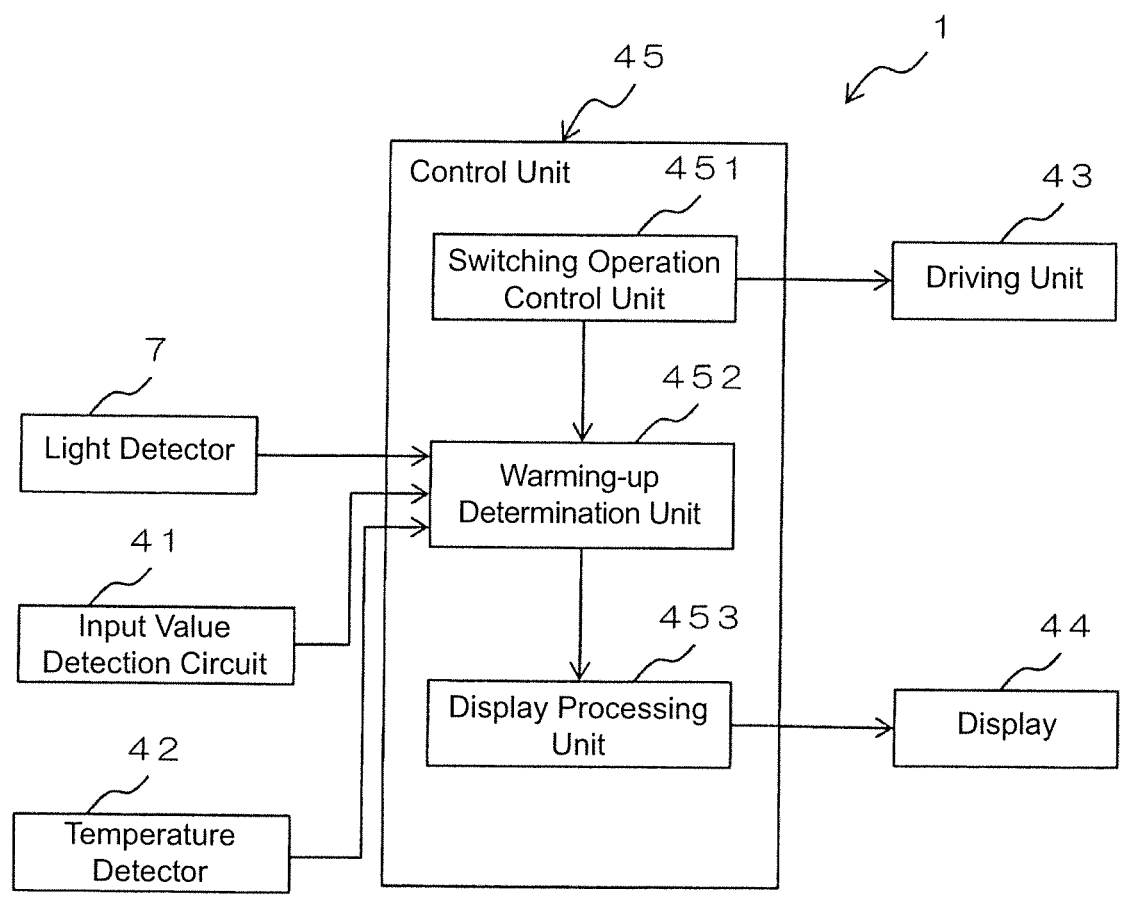
FIG. 2 is a block diagram illustrating the control unit of the spectrophotometer in FIG. 1 and the electrical configuration of the peripheral members thereof.

FIG. 2 is a block diagram illustrating the control unit 45 and the electrical configuration of the peripheral members thereof.

The spectrophotometer 1 comprises an input value detection circuit 41, a temperature detector 42, a driving unit 43, a display 44 and the control unit 45 as the configuration of electrical components in addition to the light detector 7.

The input value detection circuit 41 detects the voltage or the current value input into the light source 2.

The temperature detector 42 is installed inside the spectroscope 4 (referring to FIG. 1). The temperature detector 42 is e.g., a temperature sensor that detects temperature inside the spectroscope 4.

The driving unit 43 is e.g., a motor that provides the rotation unit 31 (referring to FIG. 1) of the light switching unit 3 with driving force.

The display 44 comprises e.g., a liquid crystal display.

The control unit 45 comprises e.g., a CPU (central processing unit). The control unit 45 electrically connects with the light detector 7, the input value detection unit 41, the temperature detector 42, the driving unit 43 and the display 44 and so forth. When the CPU executes an program, the control unit 45 is operative as the switching operation control unit 451, the warming-up determination unit 452, and the display processing unit 453 and so forth.

The switching operation control unit 451 controls the operation of the driving unit 43.

The warming-up determination unit 452 starts determining the completion of warming-up of the spectrophotometer 1 in accordance with the control operation of the switching operation control unit 451. In addition, the warming-up determination unit 452 determines the completion of the warming-up of the spectrophotometer 1 based on the results of the light detector 7, the input value detection circuit 41, and the temperature detector 42.

The display processing unit 453 executes processing to display 44 the completion of the warming-up based on the determination result of the warming-up determination unit 452.

3. Control Operation with the Control Unit

Figure 3:
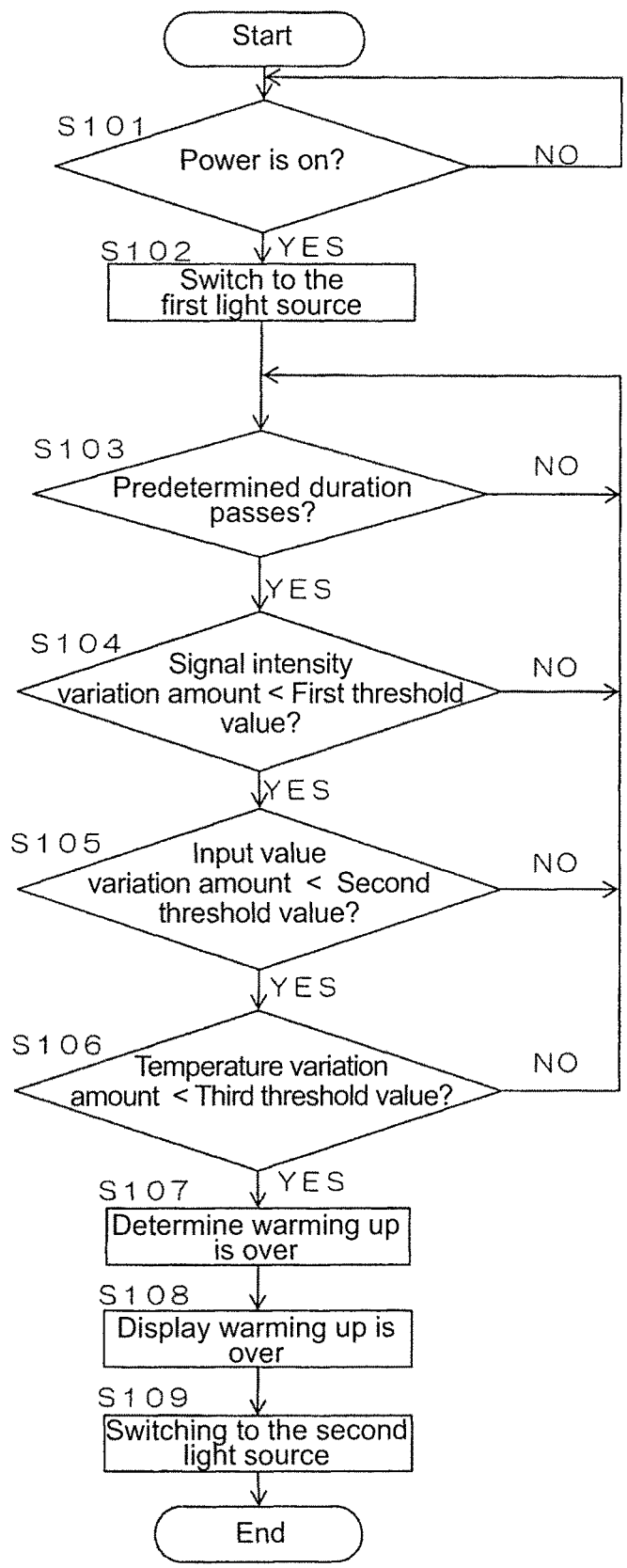
FIG. 3 is a flow-chart illustrating an example of the control operations of the control unit.

FIG. 3 is a flow-chart illustrating an example of the control operations of the control unit 45. FIG. 3 is the flow of the control when the warming-up operation is carried out relative to the spectrophotometer 1.

With respect to the spectrophotometer 1, the warming-up thereof is carried out while no sample cell 6 is loaded in the sample chamber 5 (i.e., the sample is not placed therein). With respect to the spectrophotometer 1, when the power turns on (Yes at the step S101) while no sample cell 6 is loaded in the sample chamber 5, the switching operation control unit 451 controls the driving operation of the driving unit 43 and the rotation unit 31 shifts to the predetermined location (rotation position). Specifically, the switching operation control unit 451 controls the driving operation of the driving unit 43 to shift the rotation unit 31 to the predetermined location, so that the light from the first light source 21 (D2 deuterium lamp) is incident to the spectroscope 4 following reflecting at the switching mirror 32. Specifically, the switching operation control unit 451 switches the mensurative light of the light source 2 to be the light from the first light source 21 (the step S102).

The warming-up determination unit 452 extracts the value of the signal intensity of the detection signal of the light detector 7, the voltage or the current input to the light source 2, and the temperature value detected by the temperature detector 42 every time, when the predetermined duration passes, following turning on the power (Yes at the step S103). Then, the warming-up determination unit 452 determines whether the warming-up is completed or not relative to the spectrophotometer 1 based on such extracted values.

Figure 4:
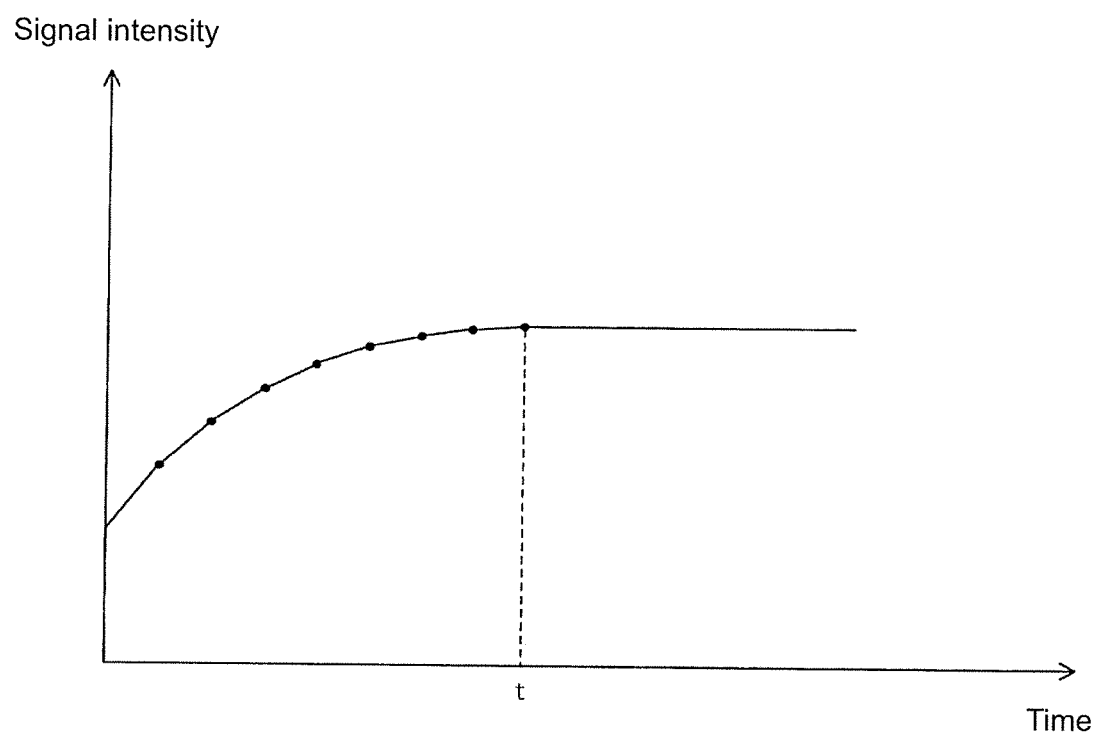
FIG. 4 is a graph illustrating the time-course variation of the signal intensity of the detection signal detected by the light detector in FIG. 1.

FIG. 4 is a graph illustrating the time-course variation of the signal intensity of the detection signal detected by light detector 7. The graph in FIG. 4 is illustrating the time-course variation of the signal intensity of the detection signal detected by light detector 7 relative to the spectrophotometer 1 right after the power turns on.

Referring to FIG. 4, right after the power of the spectrophotometer 1 turns on, the percentage of increase of the signal intensity of the detection signal detected by the light detector 7 is high and then, the percentage of increase of the signal intensity of the detection signal detected by the light detector 7 dissipates over time. And after the time t passes, the signal intensity of the detection signal detected by the light detector 7 is nearly-constant. In such a way, the signal intensity of the detection signal detected by the light detector 7 that is not stable right after the power of the spectrophotometer 1 turns on, is getting gradually constant over time and after the time t, the stable condition thereof is maintained.

In addition, though it is not shown in FIG., the value of voltage or the value of current input to the light source 2, and the temperature value detected by the temperature detector 42 vary as well as the signal intensity of the detection signal detected by the light detector 7 as set forth above. Specifically, right after the power of the spectrophotometer 1 turns on, the percentage of increase of the value of voltage or the value of current input to the light source 2, and the temperature value detected by the temperature detector 42 is high, and then the percentage of increase thereof dissipates over time and then, after a while, the respective values become nearly-constant. Specifically, though it is not shown in FIG., the graphs illustrating the time-course variation of the value of voltage or the value of current input to the light source 2 and the time-course variation of the temperature value detected by the temperature detector 42 show respectively the same profile (curve) in FIG. 4.

The warming-up determination unit 452 first determines whether the warming-up is completed or not (the first determination) based on the variation amount of the signal intensity of the extracted detection signal detected by the light detector 7.

Specifically, the warming-up determination unit 452 calculates the difference between the signal intensity of the detection signal detected by the light detector 7 at the time when the predetermined time passes and the signal intensity of the detection signal detected by the light detector 7 at the previous time (the constant time before) and determines whether the value is less than the first threshold value or not. Referring to FIG. 4, the timing when the warming-up determination unit 452 extracts the signal intensity of the detection signal detected by the light detector 7 is indicated by the points on the graph. Specifically, the time interval between the points in FIG. 4 is the predetermined duration. In such an example, the predetermined duration is constant.

And at the timing when the predetermined duration passes, when the difference (variation amount of the signal intensity of the detection signal detected by the light detector 7) between the signal intensity of the detection signal detected by the light detector 7 and the previous (constant time before) signal intensity of the detection signal detected by the light detector 7 is less than the first threshold value (Yes at the step S104), the warming-up determination unit 452 further determines whether the warming-up is over (completed) or not (the second determination) based on the voltage or the current of the light source 2 detected by the input value detection circuit 41.

Specifically, the warming-up determination unit 452 calculates the difference between the voltage or the current input to the light source 2 at the time when the predetermined time passes and the voltage or the current input to the light source 2 at the previous time (the constant time before) and determines whether such a difference value is less than the second threshold value or not. And when such a difference is less than the second threshold value (Yes at the step S105), the warming-up determination unit 452 further determines whether the warming-up is over (completed) or not (the third determination) based on the temperature inside the spectroscope 4 detected by the temperature detector 42.

Specifically, the warming-up determination unit 452 calculates the difference between the temperature value detected by the temperature detector 42 at the time, when the predetermined time passes, and the temperature value detected by the temperature detector 42 at the previous time (the constant time before) and determines whether such a difference value is less than the third threshold value or not. And when such a difference is less than the third threshold value (Yes at the step S106), the warming-up determination unit 452 determines whether the warming-up is over (completed) with respect to the spectrophotometer 1.

In such a way, the warming-up determination unit 452 determines that the warming-up of the spectrophotometer 1 is correctly accomplished when all determinations, including the determination at the step S104 (the first determination), the determination at the step S105 (the second determination), and the determination at the step S106 (the third determination), indicate the completion of the warming-up (the step S107).

And the display procession unit 453 display the fact of the completion of the warming-up on the display 44 (step S108). In addition, the switching operation control unit 451 controls the driving operation of the driving unit 43 so that the light from the second light source 22 (WI lamp) is incident to the spectroscope 4 following reflecting at the switching mirror 32 and the rotation unit 31 shifts to the predetermined location. Specifically, the switching operation control unit 451 switches the mensurative light of the light source 2 to be the light from the second light source 22 (the step S109).

Under such a state, the user sets the sample cell 6 inside the sample chamber 5 and starts the analysis operation.

In addition, according to the aspect of the present Embodiment, with respect to the respective determinations at the step S104 (first determination), at the step S105 (second determination) and at the step S106 (third determination), the determination of the warming-up can be carried out using the latest plurality of the measurement values including the measurement value at the time when the predetermined duration passes and the previous (constant time before) measurement value. For example, the determination of the completion of the warming-up can be carried out based on that the state in which the difference between the measurement value at some timing and the measurement value at the previous timing thereof is less than the threshold value takes place continuously multiple times.

4. Action and Effect (1) Referring to FIG. 2, according to the aspect of the present Embodiment, the spectrophotometer 1 comprises the control unit 45. The control unit 45 comprises the warming-up determination unit 452. The warming-up determination unit 452 determines the completion of the warming-up based on the variation amount of the detection signal in the predetermined duration when the light detector 7 detects the light from the light source 2 (second light source 22) without transmitting the sample or reflecting from the sample (the step S104 in FIG. 3). Specifically, the warming-up determination unit 452 calculates the difference between the signal intensity of the detection signal detected by the light detector 7 at the time when the predetermined time passes and the signal intensity of the detection signal detected by the light detector 7 at the previous time (the constant time before) and determines whether the value is less than the first threshold value or not. And when such a difference is less than the first threshold value, the warming-up determination unit 452 determines that the warming-up is complete.

Accordingly, the warming-up determination unit 452 automatically determines the completion of warming-up independently from the determination by the user. And when the analysis operation starts using the spectrophotometer 1 based on the warming-up completion determined by the warming-up determination unit 452, the analysis is carried out using the spectrophotometer 1 subjected to be warmed up just in a suitable time duration.

Specifically, the spectrophotometer 1 according to the aspect of the present Embodiment is suitably warmed up for the adequate time.

(2) In addition, according to the aspect of the present Embodiment, with respect to the spectrophotometer 1, the warming-up determination unit 452 determines the completion of warming-up based on the variation amount of the voltage or the current input to the light source 2 (the step 105 in FIG. 3).

Specifically, with respect to the spectrophotometer 1, the warming-up determination unit 452 determines the completion of the warming-up based on the variation amount of the voltage or the current input to the light source 2 in addition to the variation amount of the detection signal detected by the light detector 7.

Accordingly, the warming-up determination unit 452 improves the determination accuracy relative to the completion of warming-up.

(3) In addition, according to the aspect of the present Embodiment, with respect to the spectrophotometer 1, the warming-up determination unit 452 determines the completion of warming-up based on the variation amount of the temperature detected by the temperature detector 42 (the step S106 in FIG. 3).

According to such an aspect, with respect to the spectrophotometer 1, the warming-up determination unit 452 determines the completion of the warming-up based on the variation amount of the temperature of the spectroscope 4 detected by the temperature detector 42 in addition to the variation amount of the detection signal by the light detector 7.

Accordingly, the warming-up determination unit 452 improves the determination accuracy relative to the completion of warming-up.

(4) Referring to FIG. 3, according to the aspect of the present Embodiment, the warming-up determination unit 452 extracts the value of the signal intensity of the detection signal detected by the light detector 7, the voltage or the current input to the light source 2, and the temperature value detected by the temperature detector 42 every time when the predetermined duration passes (Yes at the step S103). Then, the warming-up determination unit 452 determines whether the warming-up is completed or not relative to the spectrophotometer 1 based on such extracted values. Specifically, the warming-up determination unit 452 repeats multiple times the determination process within the predetermined duration.

Accordingly, the warming-up determination unit 452 improves the determination accuracy relative to the completion of warming-up.

(5) In addition, referring to FIG. 1, the light source 2 comprises the first light source 21 made of the deuterium lamp and the second light source 22 made of the tungsten lamp with respect to the spectrophotometer 1. In addition, with respect to the spectrophotometer 1, the control unit 45 comprises a switching operation control unit 451 The switching operation control unit 451 selectively switches the light from between the first light source 21 and the second light source 22, so that the selected light is incident to the light detector 7. Specifically, with respect to the spectrophotometer 1, the switching operation control unit 451 switches the mensurative light of the light source 2 to be the light from the first light source 21 (the step S102 in FIG. 3).

In general, the time from the time when the power source is turned on until the time when the deuterium lamp becomes stable is longer than the time from the time when the power source is turned on until the time when the tungsten lamp becomes stable.

According to the aspect of the present Embodiment, the warming-up determination unit 452 determines the completion of the warming-up based on the variation amount of the detection signal when the light detector 7 detects the light from the first light source 21 made of the deuterium lamp. Specifically, the warming-up determination unit 452 determines the completion of the warming-up based on the variation amount of the detection signal detected by the light detector 7 that detects the light from the first light source 21 that takes relatively long time until stabilized. And when the warming-up determination unit 452 determines that the warming-up is complete, both operations of the first light source 21 and the second light source 22 are suitably stabilized.

Accordingly, the warming-up determination unit 452 improves the determination accuracy relative to the completion of warming-up.

5. Embodiment 2

Figure 5:
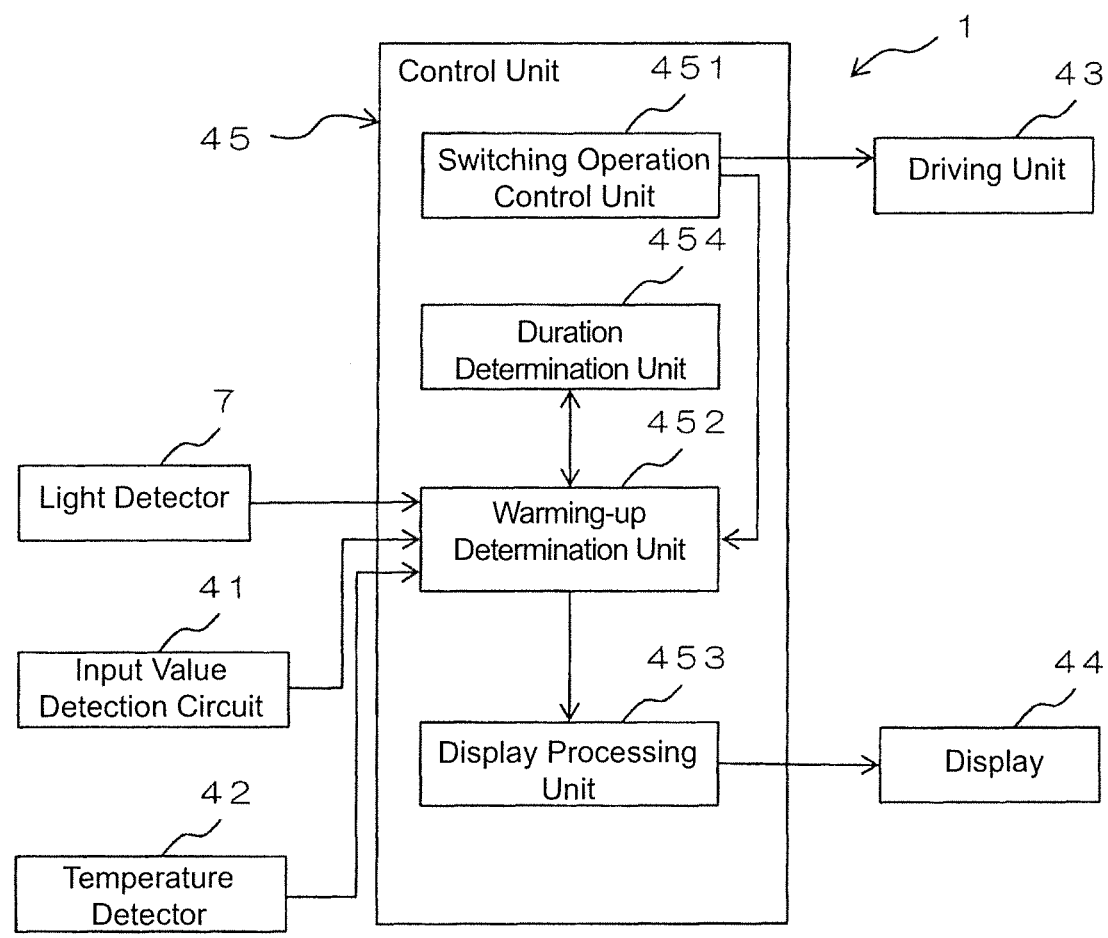
FIG. 5 is a block diagram illustrating the control unit of the spectrophotometer and the electrical configuration of the peripheral members thereof according to the aspect of the Embodiment 2 of the present invention.
Figure 6:
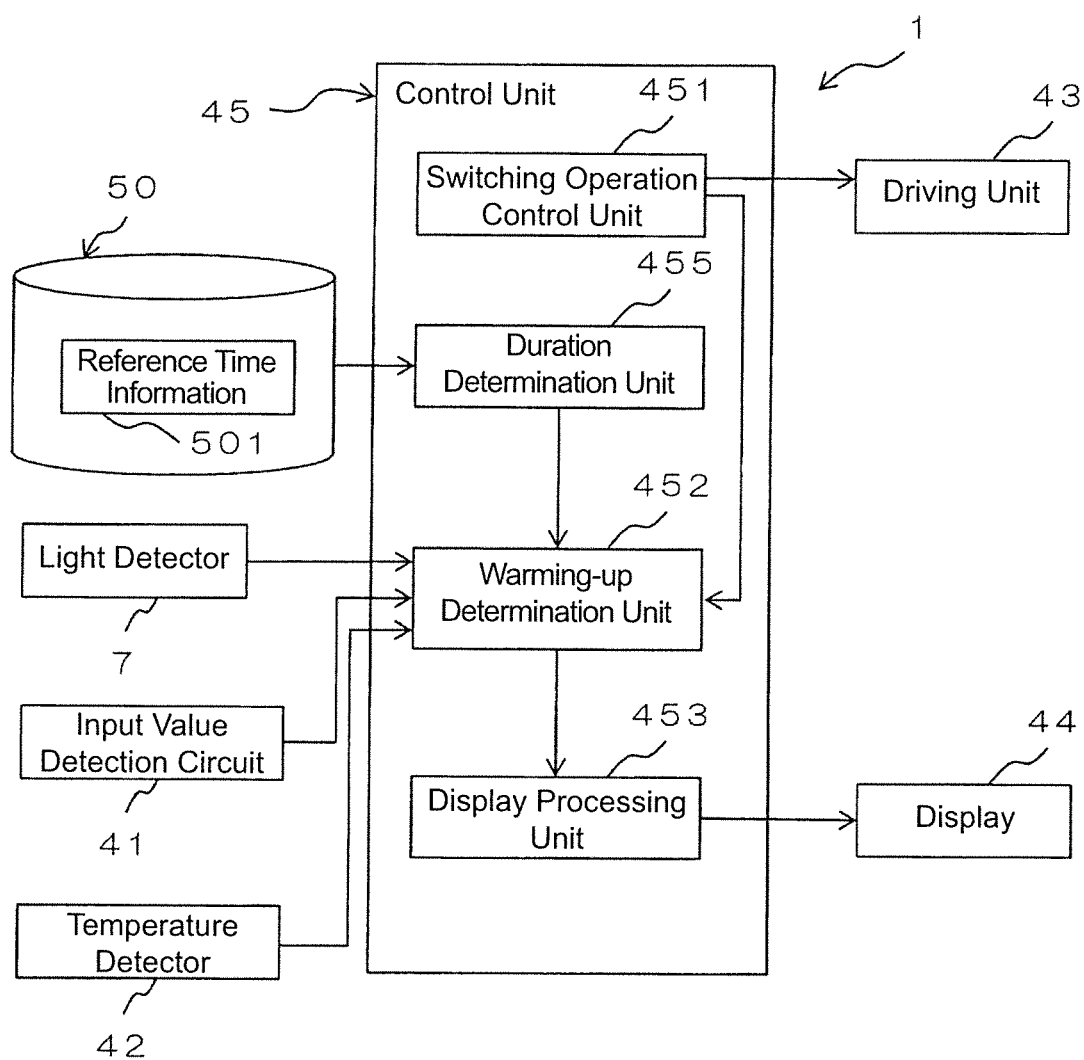
FIG. 6 is a block diagram illustrating the control unit of the spectrophotometer and the electrical configuration of the peripheral members thereof according to the aspect of the Embodiment 3 of the present invention.

Hereafter, the inventor sets forth the other Embodiments of the present invention referring FIG. 5 and FIG. 6. In addition, the same unit as illustrated according to the aspect of the Embodiment 1 is not set forth while providing the identical reference sign.

FIG. 5 is a block diagram illustrating the control unit 45 of the spectrophotometer 1 and the electrical configuration of the peripheral members thereof according to the aspect of the Embodiment 2 of the present invention.

According to the aspect of the Embodiment 1 set forth above, the timing when the warming-up determination unit 452 determines completion of warming-up comes up every predetermined time in advance.

On the other hand, according to the aspect of the Embodiment 2, the timing when the warming-up determination unit 452 determines completion of warming-up is decided based on the previous determination timing.

Specifically, according to the aspect of the Embodiment 2, the control unit 45 is also operative as the duration determination unit 454.

The duration determination unit (circuit) 454 determines the next determination timing for the warming-up determination unit 452 (a predetermined duration until the next determination) based on the variation amount of the detection signal detected by the light detector 7 when the warming-up determination unit 452 determines.

With respect to the spectrophotometer 1, when carrying out warming-up, the control unit 45 carries out the same control operation as set forth above. Now, according to the aspect of the Embodiment 2, in the case of 'No' in the steps S104-S106 in FIG. 3, the duration determination unit 454 determines the next timing for determination with the warming-up determination unit 452 (a predetermined duration until the next determination).

For example, the duration determination unit 454 determines the next predetermined duration based on the value obtained by multiplying the difference (variation amount of the signal intensity of the detection signal detected by the light detector 7), between the signal intensity of the detection signal detected by the light detector 7 at the time when the predetermined time passes and the signal intensity of the detection signal detected by the light detector 7, by the predetermined coefficient. And at the step S103, it is determined whether the duration determined by the duration determination unit 454 passes or not.

Accordingly, when the variation amount of the detection signal detected by the light detector 7 is large, the predetermined duration to the next determination with the warming-up determination unit 452 is longer, and when the variation amount of the detection signal detected by the light detector 7 is small, the predetermined duration to the next determination with the warming-up determination unit 452 is shorter.

In such a way, according to the aspect of the present Embodiment 2, the control unit 45 of the spectrophotometer 1 comprises the duration determination unit 454. And the duration determination unit (circuit) 454 determines the predetermined duration until the next determination for the warming-up determination unit 452 based on the variation amount of the detection signal detected by the light detector 7 when the warming-up determination unit 452 determines the predetermined duration.

Therefore, the determination timing for the warming-up determination unit 452 (time of the predetermined duration) with respect to the spectrophotometer 1 is adequately maintained.

6. Embodiment 3

FIG. 6 is a block diagram illustrating the control unit 45 of the spectrophotometer 1 and the electrical configuration of the peripheral members thereof according to the aspect of the Embodiment 3 of the present invention.

According to the aspect of the Embodiment 1 set forth above, the timing when the warming-up determination unit 452 determines completion of warming-up comes up every predetermined time in advance.

On the other hand, according to the aspect of the Embodiment 3, the timing when the warming-up determination unit 452 determines completion of warming-up is decided based on the reference time.

Specifically, according to the aspect of the Embodiment 3, the spectrophotometer 1 further comprises the memory storage 50.

The memory storage 50 comprises e.g., such as ROM (read only memory), RAM (random access memory) and a hard-disk drive. The memory storage 50 stores reference time information 501. The reference time information 501 is the inherent information relative to the apparatus and the time information (reference time information) that is a benchmark for completion of warming-up. The reference time information 501 is stored in the memory storage 50 in advance.

Specifically, according to the aspect of the Embodiment 3, the control unit 45 is also operative as the duration determination unit 455.

The duration determination unit 455 determines the next determination timing for the warming-up determination unit 452 (a predetermined duration until the next determination) based on the reference the time information 501 in the memory storage 50.

With respect to the spectrophotometer 1, when carrying out warming-up, the control unit 45 carries out the same control operation as set forth above. Now, according to the aspect of the Embodiment 2, in the respective cases of 'No' at the step S104, 'No' at the step S105 and 'No' at the step 106 in FIG. 3, the duration determination unit 455 determines the next timing for determination with the warming-up determination unit 452 (a predetermined duration until the next determination).

Specifically, the duration determination unit 455 reads out the reference time information 501 from the memory storage 50 and in addition, calculates the duration until the time (reference time) when the reference time information 501 denotes. And the duration determination unit 455 determines so that whereas the next determination timing with the warming-up determination element 452 (the predetermined duration until the next determination) is set as long when the time (reference time) that the reference time information 501 denotes is long, the next determination timing with the warming-up determination element 452 (the predetermined duration until the next determination) is set as short when the time (reference time) that the reference time information 501 denotes is short. And at the step S103, it is determined whether the duration determined by the duration determination unit 454 passes or not.

In such a way, according to the aspect of the Embodiment 3, the duration determination unit 455 determines the predetermined duration so that the closer to the time (reference time) that the reference time information 501 denotes is, the shorter the predetermined duration is.

Therefore, the duration determination unit 455 adequately determines the predetermined duration at the next determination for the warming-up determination unit 452.

7. Alternative Embodiment

According to the aspect of the Embodiment set forth above, the spectrophotometer 1 comprises the display 44 and the control unit 45. However, an independent operation processing device comprising the display 44 and the control unit 45 is installed and the control operation set forth above can be carried out using such an operation processing unit. Specifically, such an independent operation processing device can execute the warming-up determination method set forth above. In such a case, when warming-up is over, the fact that the warming-up is over is preferably displayed on the display of the operation processing device.

In addition, according to the aspect of the Embodiment set forth above, the warming-up is carried out while no sample cell 6 is loaded in the sample chamber 5. However, the structure of the spectrophotometer 1 provide an optional pathway, wherein a plurality of mirrors is in-place in the sample chamber 5, and the incident light to the sample chamber 5 reflects at the mirrors so as to bypass the sample cell 6, and then after, the light is incident to the light detector 7. In such a case, a sample cell 6 can be always in-place inside the sample chamber 5.

In addition, according to the aspect of the Embodiment set forth above, the warming-up determination unit 452 executes all determinations including the first determination, the second determination and the third determination. However, the warming-up determination unit 452 can execute any one of all determinations or any two of all determinations. In addition, the threshold value used in each determination can be set up by the user.

In addition, according to the aspect of the Embodiment set forth above, the light source 2 comprises the first light source 21 made of the deuterium lamp (D2 lamp) and the second light source 22 made of the tungsten lamp (WI lamp). However, the light source 2 can comprises the other lamp than the above lamps as the light source thereof. In addition, the light source that the light source 2 is not limited to two and can be just one or more than three. In addition, when the light source of the light source 2 is one, the light source switching unit 3 is not mandatory.

In addition, in the case of that the determination processing for the warming-up completion can be executed on the determination every predetermined time right after the apparatus is activated only in the first activation of the instrumentation, the time of the first warming-up completion is stored in the memory storage and such a processing can be skipped in the constant interval right after the activation, and when the instrumentation is activated at the next time, the determination processing can be started right before and after the time when the previous warming-up is completed based on the time when the previous warming-up is completed. In addition, when a plurality of temperature detectors is installable, the temperature detectors are installed to the plurality of locations and the variations thereof can be monitored. The temperature of the plurality of locations is monitored, so that completion of warming-up can be further precisely determined.

REFERENCE OF SIGNS

1 Spectrophotometer
2 Light source
3 Light source switching unit
4 Spectroscope
5 Sample chamber
7 Light detector
21 First light source
22 Second light source
31 Rotation unit
32 Switching mirror
41 Input value detection circuit
42 Temperature detector
45 Control unit
50 Memory storage
452 Warming-up determination unit
454 Duration determination unit
455 Duration determination unit
501 Reference time information As used herein, a system, instrument, or apparatus comprises all of the elements necessary to work as an intended device of this disclosure, including any needed input device for receiving data, output device for outputting data in any tangible form (e.g. data stream, calculated results, printing or displaying on an imagery screen, image, etc.), any necessary memory for storing data as well as computer code, and a processor/microprocessor for executing code wherein said computer code resident in said memory and process said data within said processor/microprocessor and output said processed data via said output device.

It will be further understood by those of skill in the art that the apparatus and devices and the elements herein, without limitation, and including the sub components such as operational structures, circuits, communication pathways, and related elements, control elements of all kinds, display circuits and display systems and elements, any necessary driving elements, inputs, sensors, detectors, memory elements, processors and any combinations of these structures etc. as will be understood by those of skill in the art as also being identified as or capable of operating the systems and devices and subcomponents noted herein and structures that accomplish the functions without restrictive language or label requirements since those of skill in the art are well versed in related analytical instrumentations and determination methods, computers and operational controls and technologies of imagery devices and all their sub components, including various circuits and combinations of circuits without departing from the scope and spirit of the present invention.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

Operations as described herein can be carried out on or over a web-site (wired or wireless accessed). The website can be operated on a server-type computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventors intend that only those claims which use the words "means for" (used in required combination of 'means+for') are intended to be interpreted under 35 USC 112, sixth paragraph. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. An analytical instrumentation, comprising:
   a sample chamber that loads a sample;
   a light source that radiates a light to a position of said sample in said sample chamber;
   a light detector that detects said light from said sample chamber;
   a warming-up determination unit that determines completion of warming-up of said analytical instrumentation based upon a variation amount of a detection signal in a predetermined duration when said light detector detects said light from said sample chamber without loading said sample;
   wherein said warming-up determination unit determines that a difference between a detection signal at a time when said predetermined duration passes and a detection signal at a previous time, when said predetermined duration has passed, is less than a threshold value every time when said predetermined duration passes, and that said warming-up is complete when said difference less than said threshold value takes place multiple continuous times.

2. The analytical instrumentation, according to claim 1, further comprising:
   an input value detection circuit configured to detect a voltage or a current value input into the light source, wherein:
   said warming-up determination unit determines that said warming-up is complete based on at least one variation amount selected from a group consisting of the voltage input to said light source in said predetermined duration and the current input to said light source in said predetermined duration.

3. The analytical instrumentation, according to claim 1, further comprising:
   a spectroscope that disperses light from said light source; and
   a temperature detector that detects a temperature of said spectroscope;
   wherein said warming-up determination unit determines that warming-up of said analytical instrumentation is complete based on a variation amount of said temperature detected with said temperature detector in a predetermined duration.

4. The analytical instrumentation, according to claim 1, further comprising:
   a duration determination unit that determines said predetermined duration with respect to a next determination with said warming-up determination unit based on said variation amount of said detection signal when said warming-up determination unit performs a determination during said predetermined duration.

5. The analytical instrumentation, according to claim 1, further comprising:
   a memory storage that stores a reference time that is a benchmark for said completion of said warming-up; and
   a duration determination unit that determines said predetermined duration, wherein the closer to the reference time said predetermined duration is, the shorter said predetermined duration is.

6. The analytical instrumentation, according to claim 1, wherein said light source further comprising:
   a first light source made of a deuterium lamp and a second light source made of a tungsten lamp; and
   a light source switching unit that selectively switches a light from between said first light source and said second light source, so that a selected light is incident to said light detector;
   wherein said light detector detects a light from said first light source in the predetermined duration.

7. A method of determining a warming-up of an analytical instrumentation that comprises a sample chamber that loads a sample, a light source that radiates a light to a position of said sample in said sample chamber, and a light detector that detects said light from said sample chamber; comprising:
- a step of determining a completion of said warming-up based upon a variation amount of a detection signal in a predetermined duration when said light detector detects said light from said sample chamber without loading said sample in said sample chamber; and
- wherein said step of determining additionally determines that a difference between a detection signal at a time when said predetermined duration passes and a detection signal at a previous time, when said predetermined duration has passed, is less than a threshold value every time when said predetermined duration passes, and that said warming-up is complete when said difference less than said threshold value takes place multiple continuous times.

* * * * *